United States Patent [19]
Hutchings et al.

[11] 4,422,762
[45] Dec. 27, 1983

[54] RING LASER

[75] Inventors: Thomas J. Hutchings, Thousand Oaks; Gary D. Babcock, Mission Viejo, both of Calif.

[73] Assignee: Litton Systems, Inc., Beverly Hills, Calif.

[21] Appl. No.: 293,722

[22] Filed: Aug. 17, 1981

Related U.S. Application Data

[63] Continuation-in-part of Ser. No. 91,019, Nov. 5, 1979, abandoned.

[51] Int. Cl.³ .............................................. G01C 19/64
[52] U.S. Cl. ..................................................... 356/350
[58] Field of Search .......................................... 356/350

[56] References Cited

U.S. PATENT DOCUMENTS 3,597,088 8/1971 Catherin .............................. 356/350
4,152,071 5/1979 Podgorski ........................... 356/350

OTHER PUBLICATIONS

Bogdanov et al., "Lock-In Band of a Gas Ring Laser", Opt. & Spectrosc, vol. 31, No. 1, Jul. 1971, pp. 51–52.

*Primary Examiner*—Vincent P. McGraw
*Attorney, Agent, or Firm*—Roy L. Brown

[57] ABSTRACT

A dithered ring laser particularly adapted for use as a gyro wherein backscatter from the mirrors is minimized by servoing the mirror inward and outward positions so that the sum of the AM amplitudes of the envelopes of the counterpropagating waves is reduced to a minimum value, then further servoing the mirrors to reduce the difference between such AM amplitudes.

25 Claims, 3 Drawing Figures

RING LASER

BACKGROUND OF THE INVENTION

This is a continuation-in-part of U.S. patent application Ser. No. 06/091,019, filed Nov. 5, 1979 by Thomas Joe Hutchings and Gary Dean Babcock for a "Ring Laser," and now abandoned.

This invention relates to ring lasers adapted to be used as angular rate sensors. Such ring lasers are frequently called ring laser gyroscopes. In such an angular rate sensor the difference between frequencies of counterpropagating radiant energy or light waves is a measure of the rate of angular rotation of the structure in which the propagating waves are traveling.

Ring laser gyroscopes utilizing counterpropagating laser beams are well known. They are used for measuring the rotation of the ring laser about a particular axis by combining portions of the sensed counterpropagating waves to generate a beat frequency at the difference frequency between the opposing waves. As the ring laser body is rotated about the predetermined axis, the frequency of waves propagating in one direction within the laser cavity is increased, and the frequency of waves propagating in the opposite direction within the laser cavity decreases. When the waves are sensed, and the resulting signals are beat against each other, the beat frequency is proportional to the angular rate of rotation of the laser.

For a ring laser gyroscope to function at low rates of rotation, frequency locking or "lock-in" must be eliminated. This phenomena occurs when two oppositely traveling waves in a resonant cavity with slightly different frequencies are pulled toward each other to a single frequency. For low angular rates of rotation of the ring laser, where frequency differences between the two opposing waves are very small, the waves are pulled together so that there is no beat frequency, and the gyroscope is insensitive to small angular rates of rotation. The effects of lock-in are described in detail in *Laser Applications,* edited by Monte Ross, Academic Press, Inc., New York, N.Y., 1971, in the article entitled, "The Laser Gyro,", by Frederick Aronowitz, pages 133-200.

A principal cause of lock-in coupling is the mutual scattering of energy from each of the beams into the direction of the other. This mutual scattering, or backscatter, is explained in detail in Aronowitz at pages 148-153. Briefly, the difference frequency between two counterpropagating waves in a ring laser is approximately governed by the equation:

$$\dot{\psi} = a + b \sin \psi$$

where $\psi$ is the instantaneous phase difference between the counterpropagating waves, a is proportional to the rate of angular rotation of the ring laser, and b is proportional to the magnitude of backscattered energy. When a is smaller than b, the beat frequency is equal to zero and the ring laser is locked in. To have an output signal which is a measure of rotation rate of the ring laser body, a is greater than b.

One means for reducing the effects of lock-in is mechanically to oscillate the ring laser body angularly about its sensitive axis. By oscillating or dithering the laser structure, a rotation rate is superimposed on the gyroscope such that most of the time a is greater than b, and the effects of b are minimized or eliminated. A gyroscope using mechanical dithering is discussed in U.S. Pat. No. 4,115,004 which issued Sept. 19, 1978 to Thomas J. Hutchings and Virgil E. Sanders.

U.S. Pat. No. 4,152,071 is the closest prior art reference known to the inventor. In that patent the apparatus uses a three-mirror ring laser which has a path length control on one of the mirrors and a lock-in control on a second mirror for controlling the mirror positions. The path length control is a fast servo, and the lock-in control is a slower servo. The third mirror partly transmits light from the laser beam to a light sensor. The signal from the light sensor is processed through the two servos, and the apparatus of the patent controls the lock-in mirror to minimize the amplitude variation, at the dither rate, of only one beam signal.

BRIEF DESCRIPTION OF THE INVENTION

When the frequencies of the counterpropagating waves are frequency modulated by mechanically dithering the ring laser angularly about its sensing axis, the signal sum of the modulation (AM) envelopes of the two counterpropagating waves should be equal.

When backscattering occurs at the surface of the mirrors, the amplitudes of the low frequency AC components of the AM signal envelopes are increased or decreased by the interference of the backscattered wave with the principal wave. It is, therefore, an object of this invention to adjust the AC amplitudes of the low frequency AC components of the AM envelopes of the counterpropagating waves by moving the mirrors inwardly and outwardly until the sum of the AC amplitudes of the low frequency AC components of the AM envelopes of the counterpropagating waves are as nearly minimum as possible.

One mechanism for adjusting the amplitudes of the low frequency AC components of the AM envelopes of the two counterpropagating waves is to servo the mirrors to a signal which is a measure of the difference in AC amplitude between two consecutively measured sums of the low frequency AC component of the AM envelopes of counterpropagating waves. After the signal representing the sum of the amplitudes of the low frequency components of the AM envelopes of the counterpropagating waves has been minimized at one mirror, the process may be repeated at the other mirrors. Alternatively, all three mirrors may be simultaneously controlled. If simultaneously controlled, it may be desirable to make the response time of the various servos different so that the servos do not produce oscillation of the mirrors.

After the mirrors are controlled to minimize the sum of the counterpropagating waves, they then optionally may be controlled to minimize the difference between such AC components of the counterpropagating waves.

The process is then repeated to minimize the sum of such AC components of the counterpropagating waves.

The concept of this invention is not confined to a three-sided ring laser typically having three mirrors. It may be used on, for example, a four-mirror, five-mirror or six-mirror ring laser, and it is not limited to those numbers of mirrors.

When one or more mirrors are servoed according to this invention, it is preferable to have one mirror servoed with a fast servo to control the overall length of the lasing path to maintain the operating point of the gyro substantially at the peak of the gain curve.

In one embodiment of the invention, for example, two mirrors of a three-mirror ring laser are slow-servoed according to this invention, and the third mirror is fast-servoed according to the prior art to tune the laser and to maintain the operating point of the gyro substantially at the peak of the gain curve.

It is also feasible and within the scope of this invention to trade off the controlling mirrors so that, for example, a first mirror is used to control the overall length of the laser path while second and third mirrors are controlled according to this invention. Then, after a period of time, the second mirror can be used to control the overall length of the laser path while the first and third mirrors are servoed according to this invention. The third or first mirror can then next be used to control the overall length of the laser path while the remaining mirrors are servoed according to this invention.

In a preferred embodiment of this invention, the AC amplitudes of the envelopes of the counterpropagating waves are sensed, and the sum of their AC amplitudes is stored in a logic circuit which may be part of a microprocessor. The AC amplitudes of the envelopes of the counterpropagating wave are again sensed and added. The AC amplitude of the new sum is subtracted from the stored sum signal. Depending upon the sense of the difference, a voltage is delivered to the piezoelectric crystals controlling a mirror position to move that mirror incrementally inwardly or outwardly. The signals are again sensed, added and compared. The process continues until a minimum difference is secured between two consecutive sum signals. That minimum is evidenced by a change in sign of the difference.

The measurements may be again repeated, but a second mirror position is adjusted in response to the difference between the sum signals produced by the AC amplitudes of the envelopes of the two counterpropagating waves.

The measurements may be repeated over and over to adjust different mirrors for minimum difference between the consecutively measured sums of the AC amplitudes of the envelopes of the two counterpropagating waves.

After the sums of the AC amplitudes of the envelopes of the counterpropagating waves have been minimized, it is within the contemplation of this invention that the differences also be minimized. To that end, in a typical embodiment of the invention, the AC amplitudes of the envelopes are subtracted and stored. The position of a mirror is then incremented, and the AC amplitudes of the envelopes are again subtracted. The differences are compared, and the mirror is incremented again in a direction to minimize the difference. Since the mirror has first been positioned to minimize the sum, it is not appropriate to minimize completely the difference signals because that might seriously affect the sum signals. Accordingly, only a predetermined number of difference signals, for example, five, shall be computed before the apparatus is returned to the mode of operation wherein the sum signals are minimized.

It is therefore an object of this invention to minimize optical scattering in a ring laser.

It is a more specific object of this invention to minimize optical scattering in such a ring laser wherein the laser is dithered about its sensing axis.

It is still a more specific object of this invention to servo at least one corner mirror of a ring laser into a position to minimize the sum of the low frequency AC amplitudes of the envelopes of the counterpropagating waves.

It is yet a more specific object of this invention to servo at least one corner mirror of a ring laser into a position to minimize the difference in AC amplitudes of the envelopes of the counterpropagating waves.

It is even a more specific object of this invention consecutively to servo consecutive mirrors in the above-mentioned fashion.

It is also an object of this invention to achieve the above-enumerated objects using a digital processor.

Other objects will become apparent from the detailed description of the invention, the drawings and the claims.

DETAILED DESCRIPTION OF THE INVENTION

Figure 1:
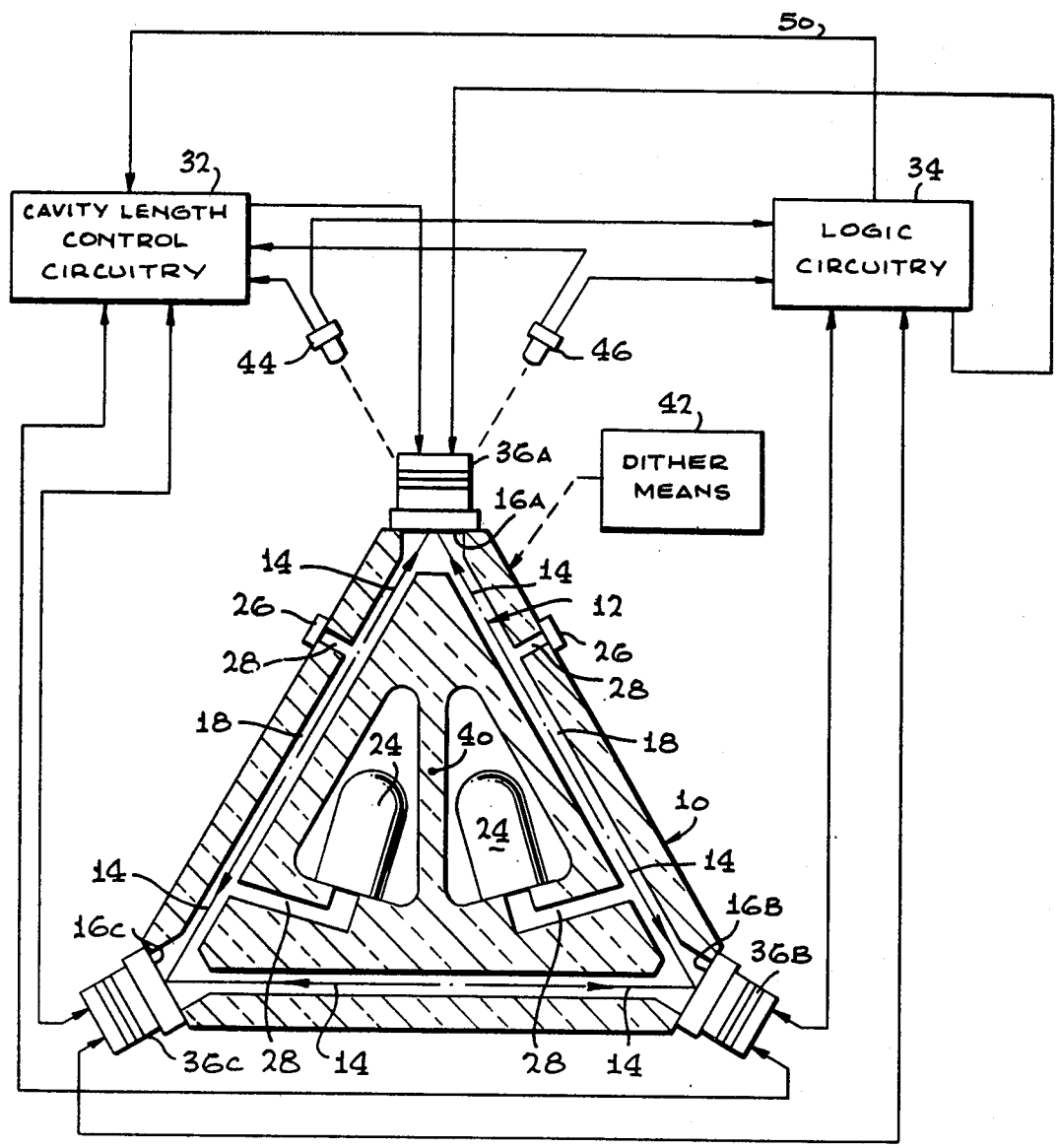
FIG. 1 is a sectional view of a typical ring laser with the position of its corner mirrors connected to be servoed.

Referring to FIG. 1, a ring laser for use as a gyro is typically embedded in a substantially rigid block 10. A polygonal conduit 12 for a laser path (shown by arrows 14) is formed in the block 10 and carries a lasing gas such as, for example, a mixture of helium 3, neon 20, and neon 22. The lase path is shown triangular, but it may have other polygonal shapes, and it need not be planar. Typically, the path is triangular or rectangular. At the vertices of the polygonal path are corner mirrors 16A, 16B, 16C for reflecting the laser light into the ring configuration wherein laser light propagates both clockwise and counterclockwise around the laser path. The laser is stimulated in gain sections 18 wherein electrons and ions migrate through the laser gas between cathodes 24 and anodes 26. Auxiliary conduits 28 connect the anodes 26 and cathodes 24 to the gain sections 18.

The length of the laser path is controlled by positioning one of the mirrors 16A, 16B, 16C inwardly and outwardly to cause the path length to be a multiple of a wavelength of the laser light. Such positioning is controlled by the circuitry 32. It is the intention of this invention to correct all of the mirrors 16A, 16B, 16C for backscattering. When a particular mirror is connected for correcting backscattering, it is not being controlled by the cavity length control circuitry 32. Accordingly, the logic circuitry 34 causes the circuitry 32 to send control signals alternately to mirrors 16A, 16B, 16C during periods when that particular mirror is not being corrected according to this invention.

Each mirror has a piezoelectric transducer 36A, 36B, 36C which may, for example, be of the type described and claimed in U.S. patent application Ser. No. 74,619 filed Sept. 12, 1979 by Thomas J. Hutchings, et al., for "Controllable Mirror" which is assigned to Litton Systems, Inc., the assignee of this patent application.

The cavity length control may be, for example, of the type described and claimed in U.S. Pat. No. 4,152,072 which issued May 1, 1979 to Thomas J. Hutchings, which is assigned to Litton Systems, Inc., the assignee of this patent application.

At low angular velocities, the counterpropagating waves are at almost the same frequency, and they tend to lock to the same frequency. The phenomenon is called lock-in. Lock-in is caused by backscattering of light from one direction of propagation into the other direction of propagation, and the synchronization of the primary light with the backscattered light.

One of the techniques for minimizing the effect of backscatter is to ensure that the angular velocity of the ring laser gyro is within the lock-in range of angular velocities only a small fraction of the total time. By mechanically dithering the ring laser by a dither means 42 about its sensing axis 40, one can ensure that the angular velocity is small for only a small portion of the time. The dithering may be cyclic, sinusoidal, or random. The dithering produces a frequency modulation in the counterpropagating ring laser waves. By adjusting the frequency or velocity and the amplitude of the dithering, one can ensure that the angular velocity of the ring laser is within the lock-in range for a very low percentage of the time.

The effective path lengths of the counterpropagating waves may also be differentially dithered using Faraday effects as described, for example, in U.S. Pat. No. 3,373,650 which issued Mar. 19, 1968 to J. E. Killpatrick for a "Laser Angular Rate Sensor."

To reduce the lock-in phenomenon further, it is desirable to position the mirrors 16A, 16B, 16C to minimize the backscattering.

The backscattering of the mirrors is minimized or reduced when the sum of the AC amplitudes of the frequency modulated envelopes is minimized.

The method of this invention, therefore, minimizes the sum of the AC amplitudes of the frequency modulated envelopes for first one mirror, then the next, then the next, and so on until it has been minimized for all of the mirrors.

After the sum of the AC amplitudes of the frequency modulated envelopes has been minimized for all mirrors, it is a refinement of the techniques of this invention to move the mirrors consecutively to minimize the difference between the AC amplitudes of the frequency modulated envelopes. However, to avoid undoing the adjusting for the minimizing of the sum, the differences are merely reduced but not necessarily minimized. For example, the amount of excursion of the mirrors may be limited to a predetermined small value during the minimizing of the difference signals.

At least two of the mirrors 16A, 16B, or 16C is preferably partly transmissive so that a pair of photosensitive instruments, such as photodiodes 44 and 46 can be used to monitor the two individual laser beams. Two other detectors at a separate transmissive mirror with light beams combined with a suitable combining means, such as shown in U.S. Pat. No. 3,373,650 is used in the usual method to measure the heterodyne difference frequency gyro signal. The outputs of such photosensitive instruments, 44 and 46, are delivered to the cavity length control circuitry, as indicated by the arrows, for use in controlling the overall length of the laser cavity. The outputs of the photosensitive instruments are also delivered to the logic circuitry 34, as indicated by the arrows, for use in minimizing the backscatter of the mirrors according to this invention.

The connection 50 between the logic circuitry 34 and the cavity length control circuitry 32 indicates that the logic circuitry is causing the cavity length control circuitry to switch its control from one mirror to another as the various mirrors are corrected according to this invention.

Typically the sensors 44, 46 are used at one mirror, a second mirror is used to control the cavity length, and a third mirror is corrected for backscattering. The mirrors are then consecutively switched as described hereinafter.

Control of the transducers 36A, 36B, 36C is indicated by the incoming arrows to those transducers.

Typically the dither means dithers at up to 500 hertz, and the amplitude of the dither is such that the frequency of the counterpropagating waves is frequency modulated over a range of on the order of $\pm 250,000$ hertz. That is, the dithering may be cyclic at frequencies which typically do not exceed 500 hertz, and the dithering may be sinusoidal. If the dithering is random, the highest frequency components of the frequency modulated counterpropagating waves should be on the order of $\pm 250,000$ hertz.

Preferably the cavity length control circuitry 32 contains a servo which is fast compared to the speed of response of the logic circuitry 34 so that the cavity length is continually tuned by moving one mirror to accommodate movement of the other mirrors which are moved to minimize backscattering.

Figure 2:
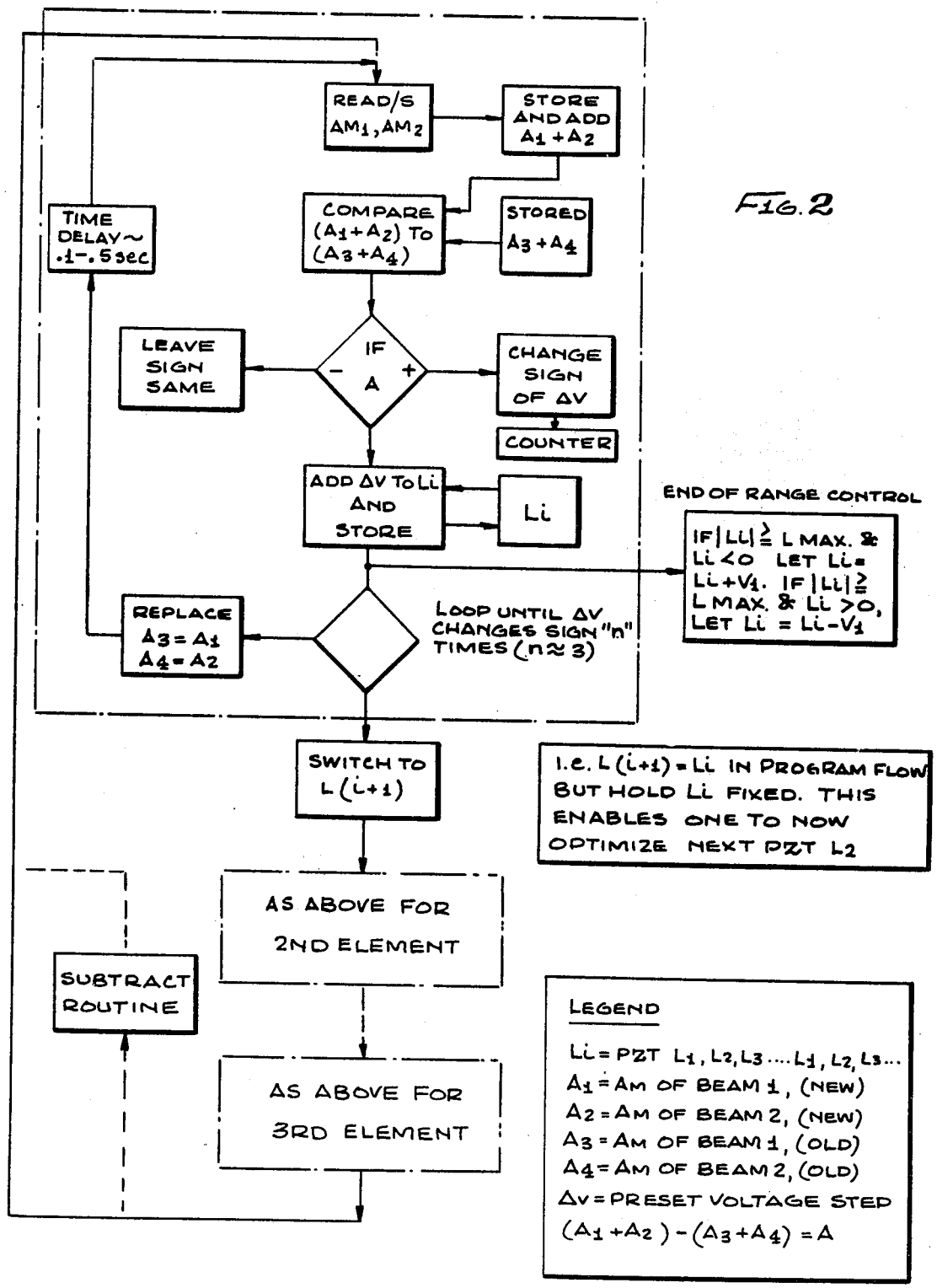
FIG. 2 is a computer flow diagram for a typical summing routine to servo a corner mirror system according to this invention.

Referring to FIG. 2, "L" pertains to the inward-outward position of the mirrors 16A, 16B, 16C and the piezoelectric transducers 36A, 36B, 36C. The subscript "i" designates the transducer 36A, 36B, or 36C which is being discussed. Further, the number of transducers and mirrors need not be limited to three. Let the subscripts "1, 2, 3," when appended to "L" correspond to "A, B, C" for the shown three mirror example.

The designation "$AM_1$, $AM_2$" means the AC amplitudes of the envelope of the frequency modulated signals sensed, for example, by the sensors 44, 46.

The designations "$A_1$, $A_2$" pertain to the signals being stored which are representative of the signal sensed by the two optical sensors such as sensors 44, 46. The designations "$A_3$, $A_4$" pertain to the signals which were stored immediately prior to the sensing of the $A_1$, $A_2$ signals. The signal "A" pertains to the equation $A = (A_1 + A_2) - (A_3 + A_4)$ when the apparatus is in its mode wherein the sum of the AC envelope signal amplitudes of the two counterpropagating waves it to be minimized, as shown in FIG. 2.

Note that the method of the invention may be practiced without a computer. For example, two AC voltmeters could be connected to the sensors, such as sensors 44, 46. Their sum could be tabulated. Then a few seconds later the positions of one of the transducers 36B, 36C could be moved in one direction or another by a predetermined small increment. If the sum of the voltmeter readings increased, the direction of movement could be reversed. The transducer could continue to be moved until the sum of the meter readings was minimized.

Similarly, an analog servo apparatus could be used. The signals detected by the sensors 44, 46 could be filtered with a low-pass filter and the signals delivered to a peak voltmeter, thence to a summing circuit whose output could be used to servo a transducer 36A or 36B until the sum is minimized.

The manual and analog mechanizations are not shown in the Figures.

In the preferred embodiment of FIG. 2, $A_1$ and $A_2$ are read and stored. $A_1$ and $A_2$ are transferred to $A_3$ and $A_4$, transducer 36B is incremented by a predetermined small amount, and a new $A_1$ and $A_2$ are stored. Actual transfer of the signals from one memory storage element to another is not necessary provided the computer keeps track of the position of each piece of data. $A_1+A_2$ is subtracted from $A_3+A_4$. If the sign of A is negative, signifying that the incrementing of the transducer 36B was in the correct direction, the control signal $L_2$ to transducer 36B is again incremented by an amount $\Delta V$ of the same sign as before, and the process is repeated until A becomes +.

When A becomes +, $L_2$ is incremented with a $-\Delta V$. The A signal then oscillates slightly about its minimum value. After $\Delta V$ has changed sign a predetermined number of times "n", control is switched from $L_2$ to $L_3$ to control the transducer 36C. The entire process is again repeated for transducer 36C until a minimum value of A is again achieved. The process is further repeated to control the transducer 36A.

If, during the minimizing of the sum of the AC amplitudes of the envelopes of the counterpropagating waves, the controlled transducer reaches the end of its range, that fact is detected and an increment $V_1$ of control signal of opposite polarity is applied to the transducer to cause the controlled mirror to jump away from its end-of-range position such that the total perimeter shifts substantially one wavelength of the laser light. Alternatively, the positions of two mirrors may be incremented to cause the perimeter length to shift one or more wavelengths of the laser light. In a preferred embodiment all mirrors will shift equally to increment the perimeter length by one or more wavelengths of the laser light. By causing all mirrors to shift equally, the scatterings of the mirrors are unchanged.

Figure 3:
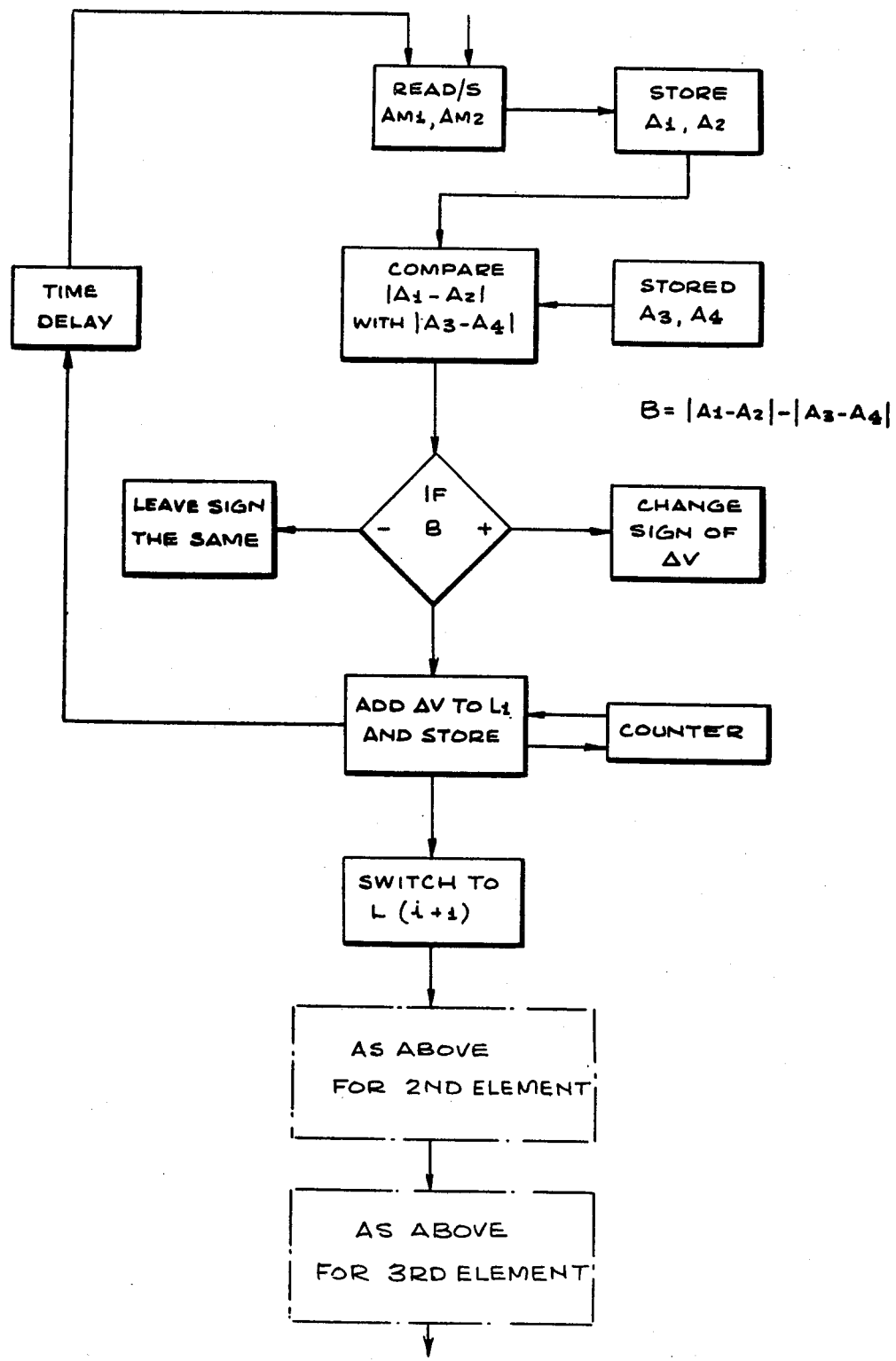
FIG. 3 is an optional flow diagram of a difference routine for an optional embodiment of the invention.

After the sum of the AC amplitudes of the envelopes of the counterpropagating waves has been minimized, it is desirable but not necessary to reduce the differences between the AC amplitudes of the envelopes of the counterpropagating waves. To that end, according to FIG. 3, the difference between $A_1$ and $A_2$ is stored, and the position of the controlled transducer is incremented by a predetermined amount $\Delta V$. The signals are again read, and the new difference amplitude is subtracted from the old difference amplitude to determine if the transducer is being incremented in the correct direction. If so, the process is repeated. If not, the sign of $\Delta V$ is reversed. The comparison is made only a predetermined number of "m" times because minimizing the difference may throw into disarray the calibration previously achieved by minimizing the sum. Accordingly, the reducing of the difference "m" times (for example, five times) merely trims the position of the transducers and mirrors off of the value wherein the sum is minimized. The weighting factor of n/m is preferably selected to fit each gyro.

After the difference is reduced "m" times on one mirror, the process is switched to a second mirror, then to a third mirror.

After the difference is reduced on all mirrors, the minimizing of the sum of the AC signals is again repeated for all mirrors.

The sequence continues.

While one mirror is being positioned according to this invention, another mirror is being adjusted by the fast servo cavity length control 32 so that relatively slow movement of the mirror according to this invention does not detune the laser.

Thus, the position of the mirrors of the laser is progressively adjusted to minimize backscatter and thereby to minimize lock-in.

Although the invention has been described in detail above, it is not intended that the invention shall be limited by that description, but only in accordance with the combination of that description taken together with the accompanying claims.

What is claimed is:

1. In combination:
   a ring laser, including a plurality of corner mirrors defining a ring laser path, transducers to control the inward and outward position of said mirrors, apparatus for detecting the AC amplitudes of the envelopes of two frequency modulated laser traveling waves counterpropagating along said laser path, apparatus for differentially dithering the laser path length, servo means for controlling the position of at least one said transducer and mirror to control and tune the length of the path of said laser;
   apparatus connected to said detecting apparatus for producing two signals which are measures of the AC amplitudes of the envelopes of said counterpropagating waves;
   summing means connected to receive said AC amplitude signals and to produce a sum signal which is a measure of the sum of said AC amplitude signals; and
   means for servoing the position of at least one of said transducers and mirrors to minimize said sum signal.

2. Apparatus as recited in claim 1 and further comprising servo control transfer means for transferring controlling signals in sequence from one said mirror to another said mirror.

3. Apparatus as recited in claim 1 and further comprising means for sensing the end of travel of said transducers; and means for incrementing the positions of said transducers and mirrors to cause the perimeter to shift by substantially an integral number of wavelengths of laser light.

4. Apparatus as recited in claim 1 in which said servo means are digital servos.

5. Apparatus as recited in claim 2 in which said servo means are digital servos, and said transferring means comprises a digital processor.

6. Apparatus as recited in claim 3 in which said servo means are digital servos, and said means for incrementing comprises a digital processor.

7. Apparatus as recited in claim 1 and further comprising:
   apparatus for subtracting said two AC amplitude signals to produce a difference signal which is a measure of the absolute amplitude of the difference between said subtracted signals;
   servo control transfer means, including means for sensing when said sum signal is minimized, for transferring control of the position of said controlled transducers and mirrors from said sum signal to said difference signal; and
   means for limiting the travel of said transducers and mirrors under control of said difference signal.

8. Apparatus as recited in claim 7 and further comprising servo control transfer means for transferring controlling signals in sequence from one said mirror to another said mirror.

9. Apparatus as recited in claim 7 and further comprising means for sensing the end of travel of said transducers, and means for incrementing the position of said transducers and mirrors by substantially an integral number of wavelengths of laser light.

10. Apparatus as recited in claim 7 in which said servo means are digital servos, and said transferring means comprises a digital processor.

11. Apparatus as recited in claim 8 in which said servo means are digital servos, and said transferring means comprises a digital processor.

12. Apparatus as recited in claim 9 in which said servo means are digital servos, and said transferring means comprises a digital processor.

13. Apparatus as recited in claim 7 and further comprising servo control transfer means, including means for sensing the travel of said controlled mirrors in response to said difference signal, for transferring control of the position of said controlled mirrors from said difference signal to said sum signal.

14. Apparatus as recited in claim 13 and further comprising servo control transfer means for transferring controlling signals in sequence from one said mirror to another said mirror.

15. Apparatus as recited in claim 13 and further comprising means for sensing the end of travel of said transducers, and means for incrementing the positions of said transducers and mirrors to cause the perimeter to change by substantially an integral number of wavelengths of laser light.

16. Apparatus as recited in claim 13 in which said servo means are digital servos, and said transferring means comprises a digital processor.

17. Apparatus as recited in claim 14 in which said servo means are digital servos, and said transferring means comprises a digital processor.

18. Apparatus as recited in claim 15 in which said servo means are digital servos, and said incrementing means comprises a digital processor.

19. Apparatus as recited in one of claims 5, 6, 10, 11, 12, 16 or 17 in which said digital processor further switches control of the laser path length away from one mirror transducer being controlled for backscatter correction to another mirror.

20. A method for reducing backscattering in dithered ring lasers having adjustable corner mirrors and
transducers for positioning said mirrors, and having means for producing electrical signals which are measures of the low frequency AC component of the envelope of counterpropagating frequency modulated laser waves comprising;
measuring the amplitudes of said electrical signals;
additively combining said amplitudes; and
adjusting the position of at least one of said transducers and mirrors to minimize the amplitude of the sum of said combined amplitudes.

21. A method as recited in claim 20 and further comprising:
subtractively combining the amplitudes of said electrical signals;
adjusting the position of at least one of said transducers and mirrors to reduce the absolute value of the difference between said last named subtractively combined signals 22. A method as recited in claim 21 in which said mirrors are consecutively adjusted through a predetermined limited range of movement to reduce the amplitude of the difference between said last named subtractively combined signals.

23. A method as recited in claim 20 in which said mirrors are consecutively adjusted to minimize the amplitude of the sum of said additively combined signal.

24. A method as recited in claim 23 and further comprising:
subtractively combining the amplitudes of said electrical signals; and
adjusting the position of at least one of said mirrors to reduce the absolute value of the difference between said last named subtractively combined signals.

25. A method as recited in claim 24 in which said mirrors are consecutively adjusted through a predetermined limited range of movement to reduce the absolute value of the difference between said last named subtractively combined values.

* * * * *